US012761240B2

(12) United States Patent
Kean

(10) Patent No.: US 12,761,240 B2
(45) Date of Patent: Oct. 13, 2026

(54) CALIBRATION ROUTINE FOR IMU MOUNTING ALIGNMENTS

(71) Applicant: LEICA GEOSYSTEMS TECHNOLOGY A/S, Odense SØ (DK)

(72) Inventor: Micheal Goulet Kean, Odense C (DK)

(73) Assignee: LEICA GEOSYSTEMS TECHNOLOGY A/S, Odense Sø (DK)

( * ) Notice: Subject to any disclaimer, the term of this patent is extended or adjusted under 35 U.S.C. 154(b) by 284 days.

(21) Appl. No.: 18/590,890

(22) Filed: Feb. 28, 2024

(65) Prior Publication Data

US 2024/0310408 A1 Sep. 19, 2024

(30) Foreign Application Priority Data

Mar. 13, 2023 (EP) .................................... 23161611

(51) Int. Cl.

*G01P 21/00* (2006.01)
*G01C 25/00* (2006.01)
*G01P 1/02* (2006.01)
*G01P 15/18* (2013.01)
*E02F 9/26* (2006.01)

(52) U.S. Cl.

CPC ............ *G01P 21/00* (2013.01); *G01C 25/005* (2013.01); *G01P 1/023* (2013.01); *G01P 15/18* (2013.01); *E02F 9/264* (2013.01)

(58) Field of Classification Search

CPC ............................... E02F 9/264; G01C 25/005
See application file for complete search history.

(56) References Cited

U.S. PATENT DOCUMENTS

2017/0146667 A1* 5/2017 Medagoda ............. G01C 25/00
2018/0164126 A1 6/2018 Schubert et al.
2020/0181884 A1* 6/2020 Green .................... G01C 19/00
2022/0243422 A1 8/2022 Kassen et al.
2022/0364322 A1* 11/2022 Boss ....................... E02F 3/437
2023/0018606 A1* 1/2023 Kalantar ................. E02F 9/264
2023/0038266 A1* 2/2023 Kean ....................... E02F 9/264

FOREIGN PATENT DOCUMENTS

EP 3904606 A1 * 11/2021 ................ E02F 3/32

OTHER PUBLICATIONS

Extended European Search Report dated Dec. 22, 2023 as received in Application No. 23161611.1.

* cited by examiner

*Primary Examiner* — Herbert K Roberts
(74) *Attorney, Agent, or Firm* — Maschoff Brennan

(57) ABSTRACT

A computer program product comprising a program code, wherein the program code is configured for calibrating mounting alignments of a set of inertial measurement units (IMUs) on a construction vehicle, wherein the set of IMUs comprises at least two IMUs each being mounted on different parts of the construction vehicle, and provides an at least partially automatically executing calibration routine for the mounting alignments of the set of IMUs on the construction vehicle, wherein for the calibration routine the following is defined: a sequence of N calibration measurements, with N greater than or equal to three, is to be carried out by the set of IMUs, and for each I-th of the N calibration measurements, with I consecutively from one to N, an I-th pose of the construction vehicle is to be adopted.

13 Claims, 5 Drawing Sheets

CALIBRATION ROUTINE FOR IMU MOUNTING ALIGNMENTS

FIELD

The present disclosure relates to a computer program product comprising a program code, wherein the program code is configured for calibrating mounting alignments of a set of inertial measurement units (IMUs) on a construction vehicle, and provides an at least partially automatically executing calibration routine for the mounting alignments of the set of IMUs on the construction vehicle.

BACKGROUND

Typical calibration schemes for inertial sensors, also called inertial measurement units (IMUs), are based on parking the construction machine on a surface, taking an IMU measurement, and parking the machine on the surface pointing in the opposite direction. If the procedure is performed correctly, the two positions will have opposing slopes. The average value of the sensor (IMU) readings in the two positions represents the bias inherent to the sensor and half of the difference between the measurements represents the slope underneath the construction machine.

US20220243422 A1 relates to the calibration of IMU systems mounted on a dozer. This system uses an adaptive system that calibrates the IMUs during operation. It first runs the machine and compares the measured slope at the blade to the measured slope at the chassis. It then uses the difference between these measurements to adjust the measurement offsets until the data is consistent with the control signals.

Prior art systems can calibrate the sensor (IMU) mounting for the roll and pitch errors/offsets using the calibration scheme described, but these prior art systems have the disadvantage that this does not calibrate for errors in the sensor headings/mounting alignments.

When mounting IMUs on a vehicle it is important to calibrate for the alignment of the coordinate axes corresponding to the sense elements within the IMU sensor and the coordinate axes that are used in software to describe the machine configuration. Misalignment will cause a misattribution of the sensor readings and a corresponding error in the sensed pose of the work machine.

In prior art systems, it is common that mountings of IMUs on linkage components of the construction machine are assumed to be aligned. That is, if an IMU is mounted on the side of a linkage component, it is assumed that the mounting surface is perfectly aligned with the machine longitudinal axis and the IMU sensors are perfectly aligned with the mounting surface. In the case of a dozer equipped with a 6-way blade, the blade is manually squared to the machine, and it is then assumed that the IMU sensor is mounted such that it is square to the centerline of the vehicle.

However, because these systems are sensitive to small errors, assuming that the components are aligned is not sufficient for high-precision work. In addition, the size of the machine components makes it very difficult to measure these alignments accurately by hand.

SUMMARY

For this reason, it is desirable to provide a system/method or software product for simple but accurate calibration of mounting alignments of IMUs on a construction vehicle.

It is therefore an object to provide a computer program product and a method, which overcome the disadvantages of the prior art.

The present disclosure relates to a computer program product comprising a program code, wherein the program code

- is configured for calibrating mounting alignments of a set of inertial measurement units (IMUs) on a construction vehicle, in particular of the type dozer, excavator, motor grader, drive loader, ski d loader or compact track loader, wherein the set of IMUs comprises at least two IMUs each being mounted on different parts of the construction vehicle, and
- provides an at least partially automatically executing calibration routine for the mounting alignments of the set of IMUs on the construction vehicle,
- wherein for the calibration routine the following is defined:
  - a sequence of N calibration measurements, with N greater than or equal to three, is to be carried out by the set of IMUs, and
  - for each I-th of the N calibration measurements, with I consecutively from one to N, an I-th pose of the construction vehicle is adopted, wherein for the first of the I-th poses
    - the construction vehicle is to be stopped aligned in a first direction on a substantially level ground at a first location, and
    - a first position of the different parts of the construction vehicle relative to one another is to be adopted, wherein a first alignment of the set of IMUs is defined by this first position of the different parts of the construction vehicle relative to one another,
  - wherein for the second of the I-th poses
    - the construction vehicle is to be aligned in a second direction, wherein the first and the second direction are rotated substantially 180° to each other,
    - the construction vehicle being aligned in the second direction is to be stopped at a second location, the first and second locations being substantially close and having a substantially equal inclination, and
    - the first position of the different parts of the construction vehicle relative to one another is to be adopted,
  - wherein for the third of the I-th poses
    - the construction vehicle has to remain
      - aligned in the first direction, in particular at the first location, or
      - aligned in the second direction, in particular at the second location, and
    - a second position of the different parts of the construction vehicle relative to each other is to be adopted, wherein a second alignment of the set of IMUs is defined by this second position of the different parts of the construction vehicle relative to one another,
- wherein the following is carried out in course of the calibration routine:
  - after adoption of the I-th pose of the construction vehicle the I-th of the N calibration measurements is initiated by an onset of a trigger event specifically predefined for the I-th of the N calibration measurements, wherein the N calibration measurements comprise at least acceleration values of acceleration sensors of the set of IMUs, and calibration data relating to the respective mounting alignments of the set of IMUs on the construction vehicle is determined or updated based on the N calibration measurements.

In other words: IMU misalignments are calculated using a prescribed set of poses and comparing the IMU sensor measurements in these poses to the nominal measurements for an aligned system. The calibration procedure is thereby performed on the work machine and the corresponding algorithm automatically calibrates the inertial sensors for mounting alignments based on calibration data and the performance of the calibration procedure. The disclosed procedure is applicable to a variety of work vehicles, in particular, for example, a dozer equipped with a 6-way blade and a front-end loader.

It is clear to the skilled person that the term "first/second position of the different parts of the construction vehicle relative to one another" means the positioning/posture of the different parts relative to each other, which is expressed, among other things, in the respective angle formed by two of the different parts. For example, a first position of the vehicle main part (cab) and arm relative to each other is adopted when the arm is oriented/arranged in space such that a 30° angle is formed between the front of the cab and the arm. A first position of cab, arm and bucket relative to each other can also mean, for example, that the arm is perpendicular to the front of the cab (so there is, for example, a 90° angle between cab and arm) and the bucket is arranged so that there is, for example, a 45° angle between arm and bucket. If a changed position (e.g. the second position) of cab, arm and bucket relative to each other is to be adopted, this can be done (depending on what is defined as changed position) by changing the positioning/posture of all three parts relative to each other. For example, the arm can be raised so that the angle formed by the front of the cab and the arm is greater than 90°, and also the position of the bucket relative to the arm can be changed so that, for example, there is a 60° angle between the arm and bucket. However, a changed position (e.g. the second position) can also be adopted, for example, by changing only the posture of one part of the construction vehicle relative to a second part (e.g. the posture of the bucket relative to the arm) and leaving the posture of the other two parts relative to each other (e.g. the posture of the arm relative to the cab) unchanged. For example, such a changed position (e.g. the second position) could be that the arm is still perpendicular to the front of the cab, but the bucket is now aligned in such a way that, for example, there is a 60° angle between arm and bucket.

It is clear to the skilled person that the term "first/second alignment of the set of IMUs" means the orientation of the respective IMUs of the set of IMUs relative to each other in the three-dimensional space. However, this term does not mean the positioning of the IMUs on an imaginary connecting line. The following example shall clarify this: If, for example, the construction vehicle has an IMU on its arm and an IMU on its bucket and the arm is lowered so that the bucket rests on the ground, then these two IMUs have a first alignment, i.e. they have a certain orientation relative to each other in space. If the arm is now raised, but the position of the bucket relative to the arm is not changed, an imaginary connecting line between the two IMUs would not change. However, by lifting the arm and thus also the bucket together with the bucket IMU, the orientation of the arm IMU and the bucket IMU relative to each other in space changes and there is a second alignment of these IMUs. In a system with an IMU on the cab, an IMU on the arm and an IMU on the bucket, a change from the first alignment of the three IMUs relative to each other to a second alignment of the three IMUs can be achieved, for example, by moving all three parts relative to each other, or, for example, by moving only one part relative to the other two unmoved parts, both resulting in a changed positioning/orientation of all three IMUs relative to each other in three-dimensional space.

It is clear to the skilled person that the term "mounting alignments" means both the concrete position/location/mounting point of the IMU on the corresponding part of the construction vehicle (e.g. is the IMU mounted on the front or on the rear of the vehicle; is the IMU mounted on the top or on the side of the arm) and the orientation/alignment of the IMU in space (e.g. is the IMU arranged parallel to the axis of gravity or slightly rotated with respect to it) or with respect to axis of the construction vehicle (e.g. are the IMU and the respective sensors in the IMU aligned with the machine longitudinal axis).

The present disclosure has the advantage over prior art systems that with the aid of the computer program product, calibration data relating to mounting alignments of IMUs on a construction vehicle can be determined easily and accurately, for example, before the start of use of the construction vehicle on a construction site or after the replacement of parts of the construction vehicle. It is only necessary to run through a certain predefined sequence of poses with the construction vehicle or its parts and the computer program product uses the IMU data collected to determine calibration data relating to the mounting alignments of the IMUs. Furthermore, the computer program product is able to identify shocking events that could potentially lead to a change in the mounting alignments of the IMUs and then provide a recommendation for a new execution of the calibration routine. This provides additional assurance that the mounting alignments of the IMUs are correctly calibrated and comfort, since the operator of the construction vehicle does not have to constantly check whether a recalibration of the mounting alignments of the IMUs is necessary.

By calibrating the mounting alignments of the IMUs using the computer program product, it is no longer necessary to make inaccurate and possibly erroneous assumptions regarding the mounting alignments of IMUs on the construction vehicle or even to perform time-consuming determinations/measurements of the mounting alignments of IMUs by hand (e.g. measurements made with a level or a smart level). Such a measurement of mounting alignments of IMUs with a level requires involves a lot of incremental fine adjustments, for example of the bucket/blade. It assumes that the level is perfectly aligned with the cutting edge. It also assumes that the rear surface of the blade is plumb when the blade is lowered and is aligned with the cutting edge. There is a lot of room for error in this procedure and because of the precision required in leveling the components, it is also quite time consuming.

An additional benefit of the calibration procedure is that there is no need to calibrate for the alignment of the IMU sensor relative to the IMU housing when the IMU is manufactured. There is no need to calibrate the sensors to the sensor housing and then the sensor housing to the machine. This procedure can be used to directly calibrate the sensors to the machine disregarding the intermediate coordinate frame of the sensor housing.

In a further embodiment, in the course of the calibration routine further a consistency check is carried out to verify that the calibration data relating to the mounting alignments of the set of IMUs on the construction vehicle have been correctly determined or updated, said consistency check comprising a plurality of sub-checks, wherein for each one of said sub-checks a cross product of two of the acceleration values determined in the I-th pose from the set of IMUs is determined, and the determined cross product is matched with a predefined threshold value, wherein the predefined threshold value corresponds to a desired residual misalignment of the set of IMUs, in particular wherein the calibration data relating to the mounting alignments of the set of IMUs on the construction vehicle are classified as correctly determined or updated by means of the consistency check if each of the determined cross products are below the predefined threshold value.

In a further embodiment, in the case that the calibration data relating to the mounting alignments of the set of IMUs on the construction vehicle are not classified as correctly determined or updated by means of the consistency check, a notification is providable to a user of the computer program product, said notification containing at least one of the following information:

for which of the sub-checks the determined cross product was above the predefined threshold value, the likely cause why the determined cross product was above the predefined threshold for the corresponding sub-check, or the magnitude of the residual misalignment of the set of IMUs, wherein the user of the computer program product can input, based on the provided information, whether the result of the consistency check is accepted anyway or whether a repetition of at least one step of the calibration routine (e.g. a repetition of a subset of the steps or a repetition of all of the steps of the calibration routine) is to be carried out. For example, if the vehicle shifted too much when lifting the cab using the arm, it may only be necessary to repeat the third pose.

In a further embodiment, in the course of the calibration routine for the third of the I-th poses, the second position of the different parts of the construction vehicle has been adopted when a first part of the construction vehicle, on which the first IMU is mounted, is moved relative to a second part of the construction vehicle, on which the second IMU is mounted, in such a way that the second alignment (i.e. the orientation of the IMUs relative to each other in space) of the first and second IMU relative to one another is altered by at least 5°, in particular by at least 10°, relative to the first alignment of the first and second IMU relative to one another, and/or the cross product of two of the acceleration values determined in the second of the I-th poses from the first and second IMU is below the predefined threshold value and/or the orientation of the first IMU and/or the second IMU relative to gravity is altered by at least 5°, in particular by at least 10° (in order to reliably detect that it has changed and how it has changed).

In a further embodiment, the construction vehicle comprises, in addition to a first part, on which a first IMU of the set of IMUs is mounted, and a second part, on which a second IMU of the set of IMUs is mounted, a third part, and the first, second and third part of the construction vehicle are each configured to be movable relative to the other two parts.

In a further embodiment, the set of IMUs comprises a third IMU, and the third IMU is mounted on the third part of the construction vehicle, wherein by moving the first, second or third part relative to the other two parts, the alignment of the first, second or third IMU relative to the other two IMUs is altered.

In a further embodiment, the first part is configured as a blade or bucket for at least moving and/or raising soil, the second part is configured as a vehicle main part (also named as cab), which comprises at least moving means and/or an operator's cabin, and the third part is configured as an arm by means of which the blade or bucket is connected to the vehicle main part.

In a further embodiment, in the course of the calibration routine for the first and the second of the I-th poses, the blade or bucket of the construction vehicle is lowered, in particular by lowering the arm, onto the substantially level ground, or a support structure located on the substantially level ground, wherein by means of this support structure the blade or bucket in the lowered state is horizontally aligned with the moving means of the construction vehicle, in which lowered state of the blade or bucket the first position of the vehicle main part, the arm and the blade or bucket relative to each other has been adopted, and the first alignment of the first, second and third IMU relative to one another is defined by this first position.

In a further embodiment, in the course of the calibration routine for the third of the I-th poses, the blade or bucket of the construction vehicle is raised from the substantially level ground or the support structure, in particular by raising the arm, or the blade or bucket of the construction vehicle is lowered to the substantially level ground, in particular by lowering the arm, and applies such high pressure to the ground that at least part of the vehicle main part raises from the ground, in which state of the vehicle main part, the arm and the blade or bucket the second position of the vehicle main part, the arm and the blade or bucket relative to each other has been adopted, and the second alignment of the first, second and third IMU relative to one another is defined by this second position.

In a further embodiment, the second position of the vehicle main part, the arm and the blade or bucket relative to each other has been adopted when the blade or bucket, on which the first IMU is mounted, is raised, in particular by raising the arm, on which the third IMU is mounted, relative to the vehicle main part, on which the second IMU is mounted, in such a way that the second alignment of the first, second or third IMU relative to one another is altered by at least 5°, in particular by at least 10°, relative to the first alignment of the first, second or third IMU relative to one another and/or the orientation of the first IMU and/or the second IMU and/or the third IMU relative to gravity is altered by at least 5°, in particular by at least 10°.

In a further embodiment, the second position of the vehicle main part, the arm and the blade or bucket relative to each other has been adopted when the blade or bucket, on which the first IMU is mounted, is lowered, in particular by lowering the arm, on which the third IMU is mounted, relative to the vehicle main part, on which the second IMU is mounted, in such a way that the second alignment of the first, second or third IMU relative to one another is altered by at least 5°, in particular by at least 10°, relative to the first alignment of the first, second or third IMU relative to one another and/or the orientation of the first IMU and/or the second IMU and/or the third IMU relative to gravity is altered by at least 5°, in particular by at least 10°.

If, in the course of the calibration routine, both of the listed embodiments (described in [0026]) of the third pose (i.e. in the course of the calibration routine a pose is to be adopted in which the blade or bucket of the construction vehicle is raised from the substantially level ground or the support structure, as well as a pose in which the blade or bucket of the construction vehicle is lowered to the substantially level ground), this results in two different second positions of the vehicle main part, the arm and the blade or bucket relative to each other in a calibration routine. In such a case, which is described for example in the following figure description, the first executed variant of the third pose is called third pose, which accordingly defines second position and second alignment. The subsequently executed variant of the third pose is then referred to as fourth pose and the second position and second alignment defined by this fourth pose are referred to as third position and third alignment in this specific example of the calibration routine for reasons of comprehension.

In a further embodiment, in the course of the calibration routine further roll and pitch angles are determined for the third IMU based on third IMU measurements in the first pose and the second pose, based on the roll and pitch angles determined for the third IMU, misalignments of said roll and pitch angles with the (slope of the) substantially level ground are determined, and based on the determined roll and pitch misalignments, the acceleration values determined by the acceleration sensors of the set of IMUs are corrected.

In a further embodiment, a notification is providable to the user of the computer program product, said notification containing information about whether and/or when a re-run of the calibration routine for the mounting alignments of the set of IMUs on the construction vehicle is necessary to ensure that on-going poses of the construction vehicle during work are correctly sensed, in particular wherein the notification is provided to the user of the computer program product in case of at least one of the following events:

movement of an object by means of the first part that is particularly heavy in relation to the weight of the construction vehicle, exchange of at least one of the different parts of the construction vehicle, or occurrence of an event that causes unforeseen vibrations in at least one of the different parts of the construction vehicle.

In a further embodiment, in the course of the calibration routine further a determination of IMU axis of the set of IMUs is carried out, in particular wherein the acceleration values determined in the first pose from the set of IMUs for the respective IMU axis are compared to the gravitational acceleration, wherein the respective IMU axis which comprises an acceleration value closest to the gravitational acceleration is considered as the respective up axis, the acceleration values determined in the third pose from the first IMU and/or the second IMU for the respective IMU axis are usable to determine the respective longitudinal axis, and the respective IMU axis at which the determined acceleration value changes the most when changing from the first to the third pose is considered as the respective forward axis, in particular wherein a sign of the respective determined acceleration value for the respective IMU axis provides the alignment, with a positive sign being aligned with the forward direction and a negative sign being aligned with the backward direction.

In the event that two axes are equally close to the vertical or forward direction, either one can be chosen. This determination is made mostly to define the convention for roll, pitch, and heading and to ensure that issues do not arise from calibrating a sensor that is pointing rearward and treating is as though it is pointing forward (or pointing down and being treated as though it is pointing up). If this determination gets the forward direction incorrect such that the determined IMU forward direction is midway between the vehicle forward and left directions, the calibration will determine a heading correction that will bring the calibrated IMU forward direction into alignment with the vehicle forward direction.

In other words, it is determined which IMU axis corresponds to the vertical direction and which axis corresponds to the forward direction. The lateral direction is determined assuming right-handed coordinates. The accelerometer measurement in the first pose is compared to gravity and the axis closest to 1 g (gravitational force equivalent/g-force) is considered the up axis. The sign of the measurement also provides the alignment, with positive corresponding to aligned and negative corresponding to anti-aligned. Next the longitudinal axis is determined using the third pose. Looking at the two remaining axes, the one that changes the most from the level to the lifted position is considered the forward axis. Once again, the sign is used to give alignment, with positive being aligned with the forward direction and negative being anti-aligned (pointing backwards). This enables a permutation matrix to be constructed that remaps the IMU sense elements so that they correspond to the approximate vehicle axes (forward, left, and up).

In a further embodiment, for the calibration routine the determination of respective IMU axis of the set of IMUs is skipped in the case that the respective IMUs of the set of IMUs are mounted on the corresponding part of the construction vehicle in a predetermined alignment relative to its vehicle axis, and/or mounting alignments of the respective IMUs of the set of IMUs are already provided to the user of the computer program product by means of a menu.

In other words, the previously described IMU axis determination is entirely optional and can be skipped if either the IMUs are all mounted in a predetermined orientation relative to the vehicle axes or if the installer uses a menu to provide the IMU mounting. It is convenient to track the using sensor type (the sensor type is only relevant in the case of different sensors having different relationships between the sensor axes and the housing), the face (fore, aft, left, right, top, or bottom) that the sensor is mounted to on the vehicle and the direction of the connector (fore, aft, left, right, up, or down) on the sensor, so that the user can quickly visually confirm that the data is correct.

In a further embodiment, in the course of the calibration routine further a sensor check is carried out to verify that the respective IMUs of the set of IMUs are online and functional.

In a further embodiment, calibration data relating to the mounting alignment of the third IMU mounted on the arm of the construction vehicle is determined or updated first.

In other words, in order to correct for smaller mounting errors, the first step is to calculate the roll and pitch measured by the arm IMU, as well as the misalignment between the sensor and the surface plane (substantially level ground). This is accomplished using the first and second pose measurements from the arm IMU. Then the blade and vehicle main part (cab) IMU is calibrated for consistency with the arm IMU. For example, on a dozer with 6-way motion, the arm is calibrated first because it only moves along one direction: rotation about the arm pin which is the vehicle y-axis.

In a further embodiment, in the course of the calibration routine it is further checked whether the first part (blade or bucket) is aligned relative to the second and/or third part of the construction vehicle in such a way that a correct execution of the calibration routine is ensured.

The present disclosure further relates to a method for calibrating mounting alignments of a set of inertial measurement units (IMUs) on a construction vehicle, in particular of the type dozer, excavator, motor grader, drive loader, skid loader or compact track loader, wherein the set of IMUs comprises at least two IMUs each being mounted on different parts of the construction vehicle, wherein the method includes an at least partially automatically executed calibration routine for the mounting alignments of the set of IMUs on the construction vehicle. For the calibration routine the following is defined:

- a sequence of N calibration measurements, with N greater than or equal to three, is to be carried out by the set of IMUs, and
- for each I-th of the N calibration measurements, with I consecutively from one to N, an I-th pose of the construction vehicle is to be adopted, wherein for the first of the I-th poses
  - the construction vehicle is to be stopped aligned in a first direction on a substantially level ground at a first location, and
  - a first position of the different parts of the construction vehicle relative to one another is to be adopted, wherein a first alignment of the set of IMUs is defined by this first position of the different parts of the construction vehicle relative to one another,
- wherein for the second of the I-th poses
  - the construction vehicle is to be aligned in a second direction, wherein the first and the second direction are rotated substantially 180° to each other,
  - the construction vehicle being aligned in the second direction is to be stopped at a second location, the first and second locations being substantially close and having a substantially equal inclination, and
  - the first position of the different parts of the construction vehicle relative to one another is to be adopted,
- wherein for the third of the I-th poses
  - the construction vehicle has to remain
    - aligned in the first direction, in particular at the first location, or
    - aligned in the second direction, in particular at the second location, and
  - a second position of the different parts of the construction vehicle relative to each other is to be adopted, wherein a second alignment of the set of IMUs is defined by this second position of the different parts of the construction vehicle relative to one another,
- wherein the following is carried out in course of the calibration routine:
  - after adoption of the I-th pose of the construction vehicle the I-th of the N calibration measurements is initiated by an onset of a trigger event specifically predefined for the I-th of the N calibration measurements, wherein the N calibration measurements comprise at least acceleration values of acceleration sensors of the set of IMUs, and
  - calibration data relating to the respective mounting alignments of the set of IMUs on the construction vehicle is determined or updated based on the N calibration measurements.

The present disclosure further relates to a method for calibrating mounting alignments of a set of inertial measurement units (IMUs) on a construction vehicle, in particular of the type dozer, excavator, motor grader, drive loader, skid loader or compact track loader, wherein the set of IMUs comprises at least two IMUs each being mounted on different parts of the construction vehicle, wherein the method comprises:

- carrying out a sequence of N calibration measurements with the set of IMUs, with N greater than or equal to three,
- adopting an I-th pose with the construction vehicle for each I-th of the N calibration measurements, with I consecutively from one to N, wherein the adoption of the first of the I-th poses comprises:
  - stopping the construction vehicle aligned in a first direction on a substantially level ground at a first location, and
  - adopting a first position of the different parts of the construction vehicle relative to one another, wherein a first alignment of the set of IMUs is defined by this first position of the different parts of the construction vehicle relative to one another,
- wherein the adoption of the second of the I-th poses comprises:
  - aligning the construction vehicle in a second direction, wherein the first and the second direction are rotated substantially 180° to each other,
  - stopping the construction vehicle being aligned in the second direction at a second location, the first and second locations being substantially close and having a substantially equal inclination, and
  - adopting the first position of the different parts of the construction vehicle relative to one another, and
- wherein the adoption of the third of the I-th poses comprises:
  - remaining the construction vehicle
    - aligned in the first direction, in particular at the first location, or
    - aligned in the second direction, in particular at the second location, and
  - adopting a second position of the different parts of the construction vehicle relative to each other, wherein a second alignment of the set of IMUs is defined by this second position of the different parts of the construction vehicle relative to one another,
- initiating the I-th of the N calibration measurements after adoption of the I-th pose of the construction vehicle by an onset of a trigger event specifically predefined for the I-th of the N calibration measurements, wherein the N calibration measurements comprise at least acceleration values of acceleration sensors of the set of IMUs, and
- determining or updating calibration data relating to the respective mounting alignments of the set of IMUs on the construction vehicle based on the N calibration measurements.

If the mounting alignments of the set of IMUs have been calibrated correctly using the computer program product and/or the methods, these IMUs can be used for the computer program product, the implement tracking unit and/or the work vehicle according to the European patent application EP 23161566.7.

BRIEF DESCRIPTION OF THE DRAWINGS

The disclosure is illustrated in more detail below, purely by way of example, with reference to working examples shown schematically in the drawing. Identical elements are labelled with the same reference numerals in the figures. The described embodiments are generally not shown true to scale and they are also not to be interpreted as limiting.

DETAILED DESCRIPTION

FIGS. 1-5 show a schematic illustration of the carrying out of an exemplary embodiment of the calibration routine. Since four calibration measurements are to be carried out for this exemplary calibration routine, two variants of the third pose are to be adopted, which is why the second variant of the third pose is named as the fourth pose.

The terms for first, second, third and fourth pose are chosen by definition and do not necessarily reflect the order in which these poses are to be adopted. If, for example, it is more practical for the operator of the calibration routine to assume the third pose before the second pose (such a case is described in the figure descriptions of FIGS. 3 and 4), then this can be done. The computer program product is capable of performing the calibration routine even if the order of the respective poses is changed, provided that the IMUs have collected the relevant IMU data with sufficient accuracy. Furthermore, the order of which of the IMUs performs the calibration measurement first or for which of the IMUs the calibration data relating to the respective mounting alignment on the construction vehicle is determined or updated first is also flexibly adjustable, i.e. the computer program product is not fixed to a specific order of the calibration measurements of the calibration routine.

A concrete example of a such a flexibly selected routine is described below: The arm IMU is calibrated first because of the well defined motion of the arm relative to the chassis/cab and how that motion relates to the coordinates of the vehicle. Then there is the procedure used to calibrate the cab IMU and blade/bucket IMU which are executed based on having first calibrated the arm IMU. This portion of the procedure requires the arm IMU to be calibrated first in order to correctly determine the misalignments of the blade IMU and arm IMU. Thus while the calibration of the chassis and blade IMUs requires the arm IMU, the calibration of the arm IMU can be performed without the inclusion of a second IMU.

Figure 1:
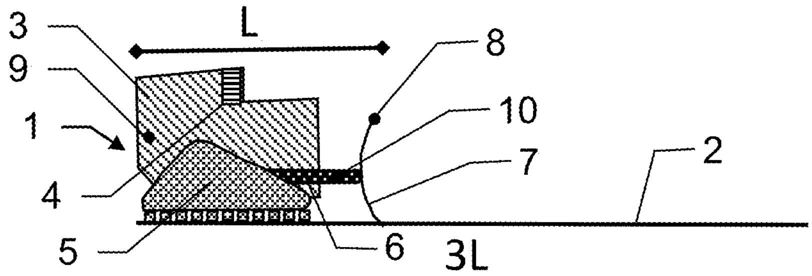
FIG. 1 shows a schematic illustration of the preparations for carrying out the calibration routine.

FIG. 1 shows a schematic illustration of the preparations for carrying out the calibration routine. The dozer 1 comprises a vehicle main part 3 (also named cab), i.e. the second part 3 of the construction vehicle 1, which also has an operators cabin 4 and movement means 5 in the form of caterpillars (crawler tracks). An arm 6, i.e. the third part 6 of the construction vehicle 1, is attached to the cab 3. This arm 6 can be rotated around a horizontal axis by means of an appropriately designed joint and can thus be moved relative to the cab 3, in particular in a lifting and a lowering movement. A shovel/blade/bucket 7, i.e. the first part 7 of the construction vehicle 1, for pushing away and/or lifting material, in particular soil, is also attached to this arm 6. This shovel 7 can be turned relative to the arm 6 by means of a suitable joint. The shovel 7 can, on the one hand, be rotated about a horizontal axis by means of this joint, allowing the inner side of the curved shovel 7 to be turned upwards and thus extend/open towards the sky or to be turned downwards and thus extend/open towards the ground. Secondly, the shovel 7 can also be rotated about a vertical axis, allowing the inner side of the curved shovel 7 to be positioned obliquely with respect to the longitudinal axis of the dozer 1. However, the shovel 7 can also be set straight, which means that the shovel is substantially parallel to the front of the dozer 1. Due to the joints between cab 3 and arm 6 as well as arm 6 and shovel 7, the three parts of the dozer 1 can be moved relative to each other and brought into different positions/postures in relation to each other.

IMUs are also attached to the respective parts of the dozer 1, i.e. cab 3, arm 6 and shovel 7. This IMUs can be brought into certain positions/orientations in space relative to each other by moving the parts in relation to each other. The first 8, second 9 and third IMU 10 each have an acceleration sensor (accelerometer) with which acceleration values are determined during the calibration measurements. The extent to which the acceleration values determined in each case are used for calibration is described in particular in the figure descriptions for FIGS. 6 and 7.

For the execution of the calibration routine, the dozer 1 is to be located on a substantially level ground 2 (also named as calibration pad or surface plane). “Substantially level ground” means a ground which has a pitch/slope/inclination/gradient of about 0% or 0°, in particular a slope/inclination of a few degrees (single-digit number range), more in particular a slope/inclination of maximum 5°. It does not matter whether the ground 2 already has this inclination from the beginning or whether the dozer 1 work on the ground 2 until it has the desired/demanded inclination.

In the example shown in FIG. 1, the calibration pad 2 has an area approximately three times the length of the dozer 1 and the width of the dozer shovel 7. Although such a size of the calibration pad 2 is advantageous for the successful execution of the calibration routine, it is not mandatory. The calibration pad 2 only needs to be large enough to allow the dozer 1 to stand substantially level, to move its arm 6 and the attached shovel 7 up and down without restriction, and to be stopped in two oppositely oriented directions at two positions being substantially close (more on this in the figure description for FIG. 4).

It is clear to the skilled person that the first part 7 of the construction vehicle 1 can be designed as any conceivable tool with the aid of which the construction vehicle 1 can perform the task assigned to it. For example, the first part 7 can be a shovel, a blade, a gripper, a drill, a tip, etc. Usually, the construction vehicle 1 is used to move a material, for example excavated earth, from one place to another or to exert a force on a certain place/material.

The dozer 1 shown with the described three-part structure is an example of a construction vehicle. The computer program product and thus the calibration routine can also be used for a variety of other construction vehicles, such as excavator, motor grader, drive loader, skid loader or compact track loader, which have the basic structure of a vehicle main part 3 (i.e. second part) and a relatively movable tool 7 (i.e. first part). The arm 6 (i.e. third part) mounted between cab 3 and shovel/bucket/gripper tool 7 and thus also the third IMU 10 mounted on the arm 6 are optional, since the computer program product is configured for calibrating the mounting alignments of the set of IMUs on the construction vehicle 1 using only IMU data of the first and second IMU 8,9.

Figure 6:
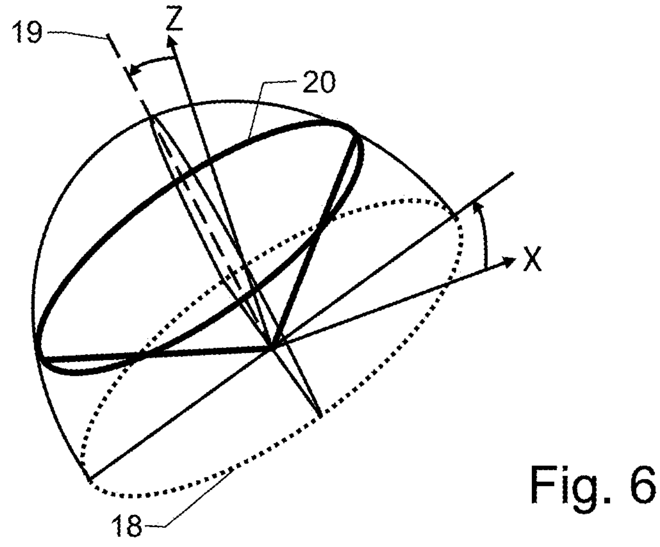
FIG. 6 shows a schematic three-dimensional illustration of what the acceleration sensors comprised by each of the IMUs of the set of IMUs measure during the execution of the calibration routine.
Figure 7:
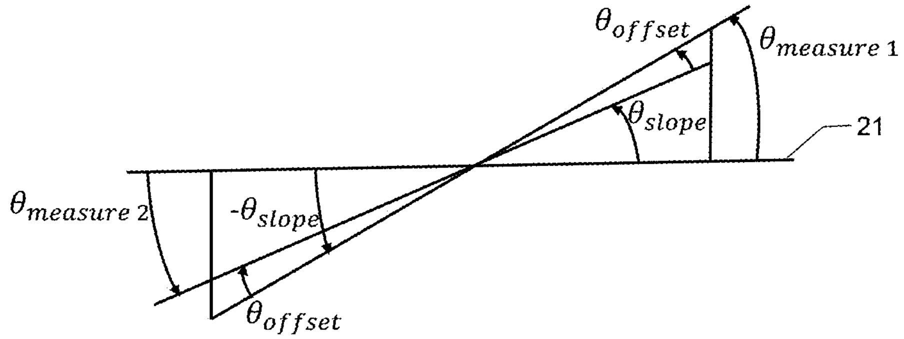
FIG. 7 shows a schematic two-dimensional illustration of a horizontal slice of the 3D geometry depicted in FIG. 6.

By means of the third IMU 10 in the shown preferred embodiment, however, calibration data relating to mounting alignments of the set of IMUs on the construction vehicle 1 can be determined more precisely, since more IMU data are available for performing the calibration and, moreover, the calculation/determination described in FIGS. 6 and 7 can be performed.

Figure 2:
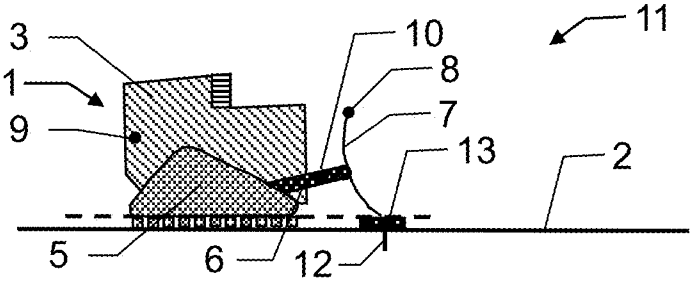
FIG. 2 shows a schematic illustration of the adoption of the first pose of the construction vehicle in the course of the calibration routine.

FIG. 2 shows a schematic illustration of the adoption of the first pose 11 of the construction vehicle 1 in the course of the calibration routine. To adopt the first pose 11, the dozer 1 is to be stopped on the substantially level calibration pad 2 (e.g. in the center of the pad) at a first location 12 facing in a first direction (this only means stopping a forward or backward movement and not stopping the engine of the dozer or even parking it for a longer period of time).

Once the dozer 1 has stopped at the first location 12, the three parts of the dozer 1 (cab 3, arm 6 and shovel 7) are moved relative to each other so that a predetermined first position/posture of these parts relative to each other is adopted. In this specific exemplary embodiment, the arm 6 and shovel 7 are lowered onto an optional support structure 13 located on the calibration pad 2. This support structure 13 is designed, for example, as a chock and serves to align the lowered shovel 7 horizontally with the moving means 5 of the dozer 1. Since the respective IMUs (first, second and third IMU 8, 9, 10) of the set of IMUs are mounted on the corresponding parts at certain positions, a certain alignment (i.e. orientation of the IMUs relative to each other in space) results for the three IMUs by taking the first position of the three parts. The shovel 7 of the dozer 1 now rests on the support structure 13, the first pose 11 of the dozer 1 is adopted and the first calibration measurement is carried out by each of the three IMUs 8, 9, 10.

In order to perform a calibration routine as accurate as possible, it is particularly advantageous to set the shovel 7 in a straight position as described above (this can be done by measuring the cylinder lengths using suitable sensors). In this way, the alignment of the IMU 8 mounted on the shovel 7 (i.e. first IMU) relative to the other two IMUs 9, 10 can be determined more accurately when taking the first position, which in turn increases the accuracy of the calibration.

Figure 3:
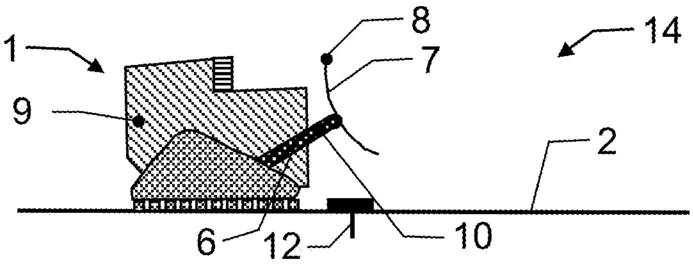
FIG. 3 shows a schematic illustration of the adoption of the third pose of the construction vehicle in the course of the calibration routine.

FIG. 3 shows a schematic illustration of the adoption of (one variant of) the third pose 14 of the construction vehicle 1 in the course of the calibration routine. For this purpose, the dozer 1 stays at the first location 12 aligned in the first direction and then raises the arm 6 together with the shovel 7 into the height (preferably in such a way that the shovel 7 is raised by at least 5°, in particular by at least 10°, compared to the height of the shovel 7/compared to gravity sensed by the IMU on the shovel 7 in the first position). In this way, the cab 3, the arm 6 and the shovel 7 adopt the second position and thus the second alignment of the first, second and third IMU 8, 9, 10 relative to one another. Then, the second calibration measurement is taken by each of the three IMUs 8, 9, 10.

Figure 4:
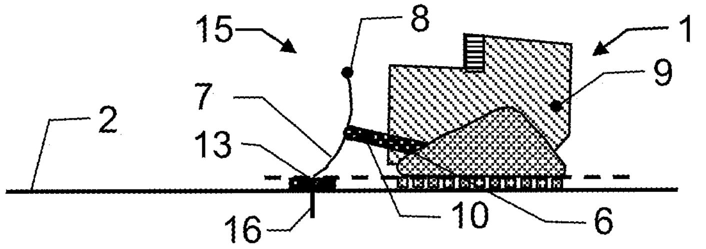
FIG. 4 shows a schematic illustration of the adoption of the second pose of the construction vehicle in the course of the calibration routine.

FIG. 4 shows a schematic illustration of the adoption of the second pose 15 of the construction vehicle 1 in the course of the calibration routine. For the adoption of the second pose 15, the dozer 1 is to be aligned in a second direction. The second direction corresponds substantially to the opposite direction of the first direction. In other words: the dozer 1 is rotated by substantially 180° when changing from the first direction to the second direction. "By substantially 180°" means that the rotation has a maximum deviation from the 180° by only a few degrees (single-digit number range) (e.g. 179°), in particular a deviation of maximum 5° (e.g. 175° or 185°). The dozer 1 stops in the second direction at the second location 16, wherein the second location 16 is to be substantially close to the first location 12. In other words: the first and the second location 12, 16 have to be at most a few meters (single-digit range) apart (e.g. 0.5 m or 1 m). Furthermore, the first and second location 12, 16 have to have a substantially equal inclination. In other words: the inclination at the second location 16 is to deviate only a few percent or degrees (single-digit range), in particular at most 5°, from the inclination at the first location 12. The calibration pad 2 in the exemplary embodiment of the calibration routine shown in FIGS. 1-5 is selected in such a way that, with a length three times the length of the dozer 1, it provides a sufficiently large flat surface that the same inclination/slope is present at both the first and the second location 12, 16.

The dozer 1 can adopt the second direction either by leaving the calibration pad 2 on one side, driving around the pad 2 and then returning to the pad 2 from the opposite side in the second direction, or by rotating on the spot (this is possible, for example, with a caterpillar drive/chain drive) by (approximately) 180°.

If the requirements for the direction of the dozer 1 and the stopping location are met, the dozer 1 moves its three parts 3, 6, 7 relative to each other to adopt the second pose so that the first position and thus the first alignment of the first, second and third IMU 8, 9, 10 is adopted. Optionally, the support structure 13 is used as a base for the shovel 7. Then the third of the four calibration measurements is taken by the three IMUs 8, 9, 10.

Figure 5:
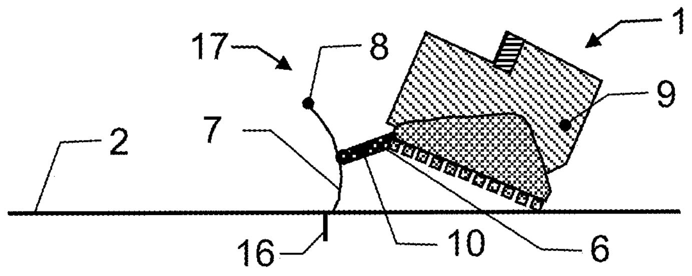
FIG. 5 shows a schematic illustration of the adoption of the fourth pose of the construction vehicle in the course of the calibration routine.

FIG. 5 shows a schematic illustration of the adoption of the fourth pose 17 (this fourth pose corresponds to a second variant of the third pose, which in this exemplary calibration routine is executed after the first variant of the third pose. To facilitate understanding, this second variant of the third pose is referred to as the fourth pose in the following) of the construction vehicle 1 in the course of the calibration routine. For the fourth pose 17, the dozer 1 remains at the second location 16 aligned in the second direction. The arm 6 is then lowered together with the dozer shovel 7 attached to it onto the calibration pad 2 (preferably in such a way that the cab 3 is raised by at least 5°, in particular by at least 10°, relative to gravity sensed by the cab IMU or relative to its position when the movement means 5 are completely on the ground 2 and thus the cab 3 is aligned more or less parallel to the ground 2).

The optional support structure 13 is removed for the adoption of the fourth pose, since by lowering the shovel 7 such a high pressure should be exerted to the ground 2 that at least part of the cab 3 raises from the ground 2. Consequently, an immense force would act on the support structure 13, which would either require an extremely massive support structure or simply lead to damage of the support structure 13.

By lowering the shovel 7 until the cab 3 is raised, the cab 3, the arm 6 and the shovel 7 relative to each other adopt the third position and thus the third alignment of the first, second and third IMU 8, 9, 10 relative to one another (this third position/third alignment corresponds to a second variant of the second position/second alignment, which in this exemplary calibration routine is adopted after the first variant of the second position/second alignment. To facilitate understanding, this second variant of the second position/second alignment is referred to as the third position/third alignment). Then, the fourth calibration measurement can be taken by each of the three IMUs 8, 9, 10.

The first and second locations 12, 16 can, but do not have to, be previously defined and manually entered to the software. They can also be determined automatically during the standard work of the dozer 1 on a construction site, if, on the one hand, the software receives an input or determines independently (e.g. through the data of suitable sensors) that a calibration of the mounting alignments of the set of IMUs is necessary again and, on the other hand, the dozer 1 is then located during its work at locations suitable for the calibration. Further, the requirements described above regarding the direction of the dozer are also fulfilled.

The adoption of the first to the fourth pose 11, 14, 15, 17 can also, but does not have to, take place in the course of a planned and step-by-step calibration routine, which can, for example, be carried out before the dozer 1 works on a construction site. The adoption of the respective poses 11, 14, 15, 17 can, for example, also be automatically detected during the standard work of the dozer 1 on a construction site, if the dozer 1 adopts the corresponding poses 11, 14, 15, 17 during its work at locations suitable for calibration and, in addition, the further requirements described above for the alignment of the dozer 1 and/or the different parts 3, 6, 7 of the dozer 1 are fulfilled.

For the adoption of the third pose 14 or fourth pose 17 in the course of the calibration routine it is not necessary that the dozer 1 remains exactly at the first or second location 12, 16 oriented exactly in the first or second direction. The software is able to perform the calibration routine in case of a deviation from the first or second location 12, 16 by a few meters (single digit number range, e.g. 0.5 m or 1 m) and/or from the first or second direction by a few degrees (single digit number range, e.g. 5°) and to determine or update the calibration data relating to the respective mounting alignments of the set of IMUs on the construction vehicle 1 based on the four calibration measurements.

Possible trigger events that could initiate the first to fourth calibration measurement could be, for example, that the first, second or third position of the three parts relative to each other corresponds to a predefined position (determined, for example, by the angles between the respective parts) or that the alignment of the three IMUs corresponds to a predefined alignment of the three IMUs (determined, for example, by a matching). Other possible trigger events could be, for example, that pressures on the shovel 7 and/or the arm 6 caused by the ground 2 and/or the support structure 13 are detected (by suitable sensors) and are interpreted as adoption of the respective pose. Other possible trigger events could also be that the shovel 7 and/or the arm 6 is changed by angles relative to the cab 3 (measured by suitable sensors), which correspond to predefined angles.

Below, the exemplary embodiment of the calibration routine described in FIGS. 1-5 is again summarized in other words:

1) Use the dozer 1 to flatten a calibration pad 2 approximately three times the length of the dozer 1 and the width of the dozer blade 7. The ground 2 need not be level, but it should be as flat as possible;
2) Park the dozer 1 in the center of the calibration pad 2;
3) Square the blade 7 by adjusting the measuring the length of the cylinders that control blade angle and adjusting the cylinder positions until the two cylinders are the same length;
4) Place chocks or other supports 13 under the blade 7 and lower it so that it rests level with the flats of the grousers 5;
5) Take a first measurement from the IMUs 8, 9, 10;
6) Raise the arm 6 of the dozer 1;
7) Take a second measurement from the IMUs 8, 9, 10;
8) Reverse the dozer 1 and back out of the calibration pad 2;
9) Drive around the calibration pad 2 and enter it from the opposite side so that the dozer 1 is facing the opposite direction as at the start of the procedure;
10) Park the dozer 1 in the center of the calibration pad 2 so that the blade 7 will be positioned along the same line as during steps 3-7;
11) Place chocks or other supports 13 under the blade 7 and lower it so that it rests level with the flats of the grousers 5;
12) Take a third measurement from the IMUs 8, 9, 10;
13) Lift the blade 7 and remove the chocks 13;
14) Lower the blade 7 into the ground 2 and lift the front of the dozer 1 as much as possible;
15) Take a fourth measurement from the IMUs 8, 9, 10;
16) Lower the front of the dozer 1 so it rests on the ground 2;
17) Calibration is now complete.

Based on the four IMU calibration measurements, the mounting alignment/orientation offsets for the three IMUs 8, 9, 10 (as an example for calibration data) are now calculated by means of the software/program code comprised in the computer program product.

FIG. 6 shows a schematic illustration of what the acceleration sensors (accelerometers) comprised by each of the IMUs 8, 9, 10 of the set of IMUs measure during the execution of the calibration routine. The X and Z axes are in global space, with gravity acting along the Z direction. The circle 18 (dotted line with small points) shows what the x and y axes of an accelerometer would measure if the accelerometer is placed on a surface plane 2 that is at an angle to gravity. The dotted line 19 (dotted line with longer lines) displaced from the Z axis shows the plane normal, this is what the z axis of the accelerometer would measure on this tilted plane. However, the accelerometer has been tilted relative to the plane. This serves to change the geometry of the accelerometer measurements. As the vehicle 1 is rotated on the plane 2 (substantially level ground), the axes of the accelerometer measure along the surface of the cone 20 rather than along the surface of the circle 18.

FIG. 7 shows one horizontal slice of the 3D geometry of FIG. 6 illustrating the geometry of the two-dimensional (2D) measurements (2D depiction of the cone). The slope of the surface/calibration pad/ground 2 is given as a pitch angle, θ and a roll angle q.

The plane of the circle 18 becomes the line 21 at an angle of $\theta_{stope}$. The coning effect forces an angular offset between the plane (or line) 21 and the measurements. This is shown by $\theta_{offset}$ in the image. Due to the slope, the measurement acts counterclockwise on both the left and right but the offset is counterclockwise on the right and clockwise on the left. This causes the measured angle to differ from the left to the right.

This effective angle is then measured by taking the cross product between the measured acceleration and the direction of gravity in the world frame. That is:

$$\Delta_1 = a_1 \times \begin{bmatrix} 0 \\ 0 \\ 1 \end{bmatrix}$$

$$\Delta_2 = a_2 \times \begin{bmatrix} 0 \\ 0 \\ 1 \end{bmatrix}$$

Where Δ is rotation, a is normalized acceleration, and the subscript denotes the first 11 or third pose 14.

On a pure slope, it is known that $\Delta_1$ and $\Delta_2$ (as examples for calibration data) would be opposite and equal. It is also known that the misalignment is equal in the two measurements. If one measurement is subtracted from the other, the slope components will add up to double the slope and the misalignment impacts will cancel each other out. If the two measurements are added together, the slope components will cancel out and the misalignments will add up to double the total misalignment.

$$\text{Slope} = \frac{\Delta_1 - \Delta_2}{2}$$

$$\text{Alignment} = \frac{\Delta_1 + \Delta_2}{2}$$

A cross product is used to calculate these slopes (as examples for calibration data), which provides the sine of the interior angle. For small angles, this is approximately the same as the angle expressed in radians. However, if large misalignments are expected, the arcsine of the cross product should first be taken prior to determining the slope and alignment in order to obtain a more accurate measurement. Both the slope and alignment are stored as Rodrigues rotations by this formulation.

At this point the slope of the surface, as measured by the arm IMU 10, and the roll and pitch offsets of the arm IMU 10 from the surface are known. The measured roll and pitch misalignments (as examples for calibration data) can be used in order to correct the measured accelerations.

$$A_{corrected} = R(\text{Alignment})A_{measured}$$

Where R is a rotation matrix (as an example for calibration data) corresponding to the rotation angles given by the alignment variable. This can be constructed using a variety of methods including Euler angle formulations, Rodrigues angle formulations, and quaternions.

Now an arm IMU 10 is calibrated for alignment to the slope, but to correct it for yaw alignment is still needed so that the longitudinal axis lies along the vehicle longitudinal axis. This will be done using corrected IMU data from the first 11 and third poses 14. The yaw calibration routine proceeds as follows.

The measured slope is taken and the direction of the vehicle lateral axis is determined.

$$Y_{vehicle} = R(\text{Slope})\begin{bmatrix} 0 \\ 1 \\ 0 \end{bmatrix}$$

Where R(Slope) is the rotation matrix corresponding to the rotation angles given by the slope variable.

Next, a cross product is used to calculate the direction of rotation between the lifted and lowered poses for the IMU 10 (as an example for calibration data).

$$\Delta_{lift} = a_{lifted} \times a_{lowered}$$

Now the misalignment between the direction of the lift motion and the direction of the surface Y-axis is determined (as an example for calibration data).

$$\Delta_{yaw} = -\Delta_{lift} \times Y_{vehicle}$$

Where the negative sign is used because lifting the arm is a negative Y-axis rotation.

It can now be corrected for yaw just as it is corrected for slope alignment. This time using $\Delta_{yaw}$ as the alignment direction (as an example for calibration data).

$$A_{corrected} = R(\text{Alignment})A_{measured}$$

Once the yaw calibration routine is complete for the arm 6, the roll and pitch angle (φ,θ) (as examples for calibration data) of the surface 2 are recalculated using the corrected measurements for the arm 6 in the first pose 11 and the second pose 15. It can now be proceeded to calibrate the cab 3 and blade 7. The same slope calibration process is used for the cab 3 as was used for the arm 6. The lift calibration for the cab 3 uses the second pose 15 and the fourth pose 17 rather than the first pose 11 and the third pose 14. In addition to this, the ground slopes and Y axis measured by the arm IMU 10 are used for the yaw calibration routine on the cab 3 to ensure it is aligned with the same axis as the arm 6.

The blade IMU 8 calibration proceeds in a slightly different order. First, the blade 7 is calibrated for yaw using the first pose 11 and the third pose 14 and the ground slopes and Y axis measured by the arm IMU 10. After being corrected for yaw, the blade IMU 8 is calibrated for roll and pitch (φ,θ) in the same manner as the other sensors.

The calibration procedure then performs an internal consistency check between the IMUs. This is done by using the cross product to determine whether a given set of IMU measurements are aligned or not. The following cross products are used to check for proper alignment:

$$\Delta 1_{Consistency} = a1_{Cab} \times a1_{Arm}$$

$$\Delta 2_{Consistency} = a3_{Cab} \times a3_{Arm}$$

$$\Delta 3_{Consistency} = a1_{Blade} \times a1_{Arm}$$

-continued $$\Delta 4_{Consistency} = a3_{Blade} \times a3_{Arm}$$

$$\Delta 5_{Consistency} = a2_{Blade} \times a2_{Arm}$$

These are equivalent to checking that the cab and arm IMU 9, 10 measurements are aligned in the two resting positions 12, 16 on the calibration pad 2 and that the arm and blade IMU 8, 10 measurements are aligned in both the resting positions 12, 16 and when the arm 6 is lifted. The consistency check is passed so long as the magnitude of each $\Delta_{Consistency}$ is below a desired threshold value corresponding to the desired residual misalignment. For instance, if the alignment is desired to be within 0.005 radians (0.29°) then a threshold value of 0.005 would be used in the consistency checks. If the consistency check fails, the operator can be alerted to which check failed, what the likely cause was, the magnitude of the residual misalignment, and can then decide whether to accept the results or rerun the auto-calibration procedure.

The measurements described above are initiated and controlled by the software/program code comprised in the computer program product, for example such that the program code initiates activation or deactivation of the corresponding sensors. The data collected by the sensors is also further processed by the software/program code, for example such that the software/program code performs the previously described calculations.

It is clear to the skilled person which hardware components (e.g. a data carrier, computing unit, etc.) are necessary to execute the software/program code comprised in the computer program product and where they are to be located (e.g. mounted in the construction vehicle 1 or set up externally and connected via a wireless connection to the construction vehicle 1 or the corresponding sensors.

Furthermore, it is clear to the person skilled in the art how, with the aid of the software/program code, the collected data (e.g. whether a pose has been correctly adopted) and/or the results of the previously described calculations (as examples for the calibration data relating to the mounting alignments of the set of IMUs on the construction vehicle 1) can be communicated or illustrated to a user of the computer program product and how this user can make inputs or how these inputs can then be processed by the software/program code.

As mentioned above (in the Background part), many calibration routines skip the yaw calibration and assume that the IMU is aligned with the vehicle axes in yaw. An alternative routine may also be to park on a slope in order to calculate the yaw alignments. This would calibrate the IMUs to a common longitudinal axis but will not necessarily calibrate that longitudinal axis such that the lateral axis lies along the arm axis of rotation. This means that the calibrated longitudinal axis may be misaligned from the true longitudinal axis.

For work machines with a planar linkage such as 4-wheel drive loaders, skid loaders, compact track loaders, excavators, etc, every additional component in the linkage can be calibrated using the procedure used for the blade IMU 8 on the dozer 1. These machines can skip the steps corresponding to centering the yaw actuation as they lack that degree of freedom. These machines may also have a different procedure for identifying the zero position with regards to rotation about the joint pins. That would constitute one or more additional calibration steps after the described calibration procedure.

Figure 8A:
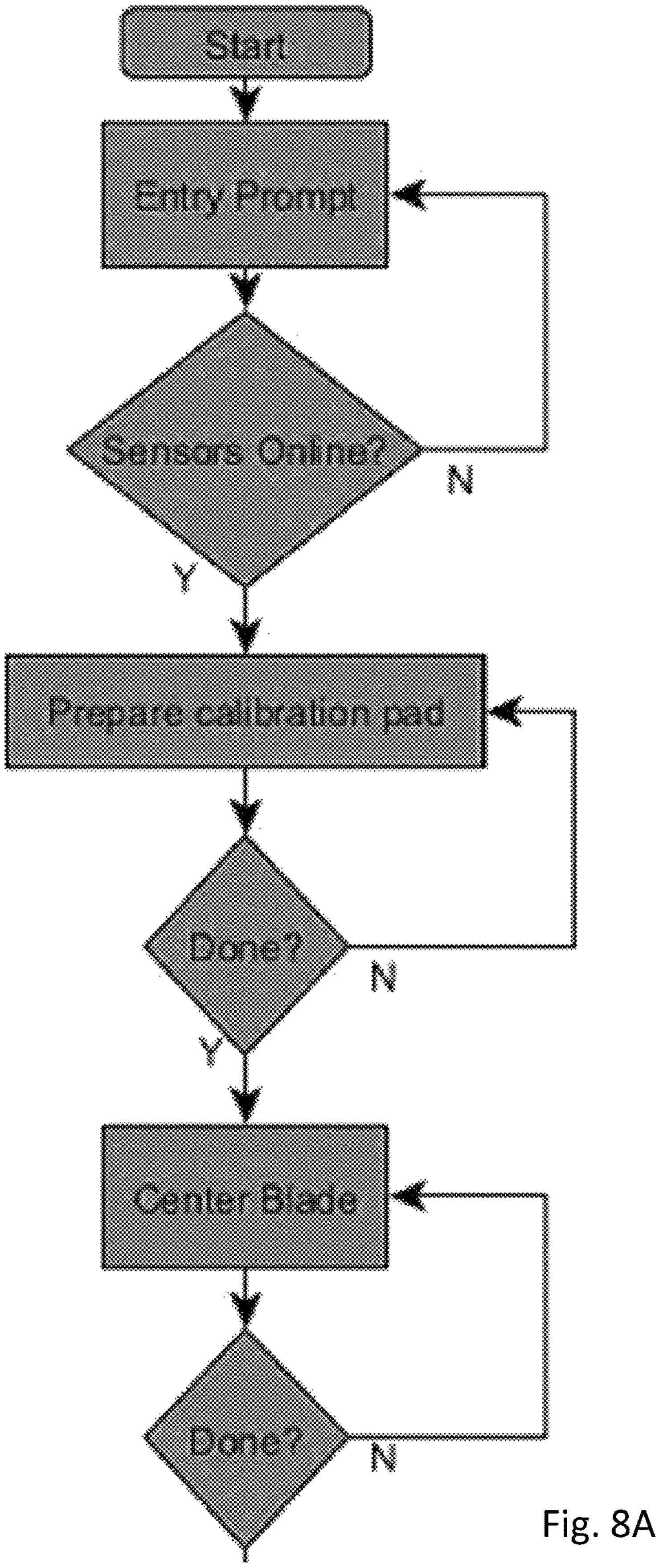
FIGS. 8A, 8B, and 8C together show a schematic block diagram illustrating exemplary steps performed during application of the computer program product for calibrating mounting alignments of a set of IMUs on a construction vehicle.
Figure 8B:
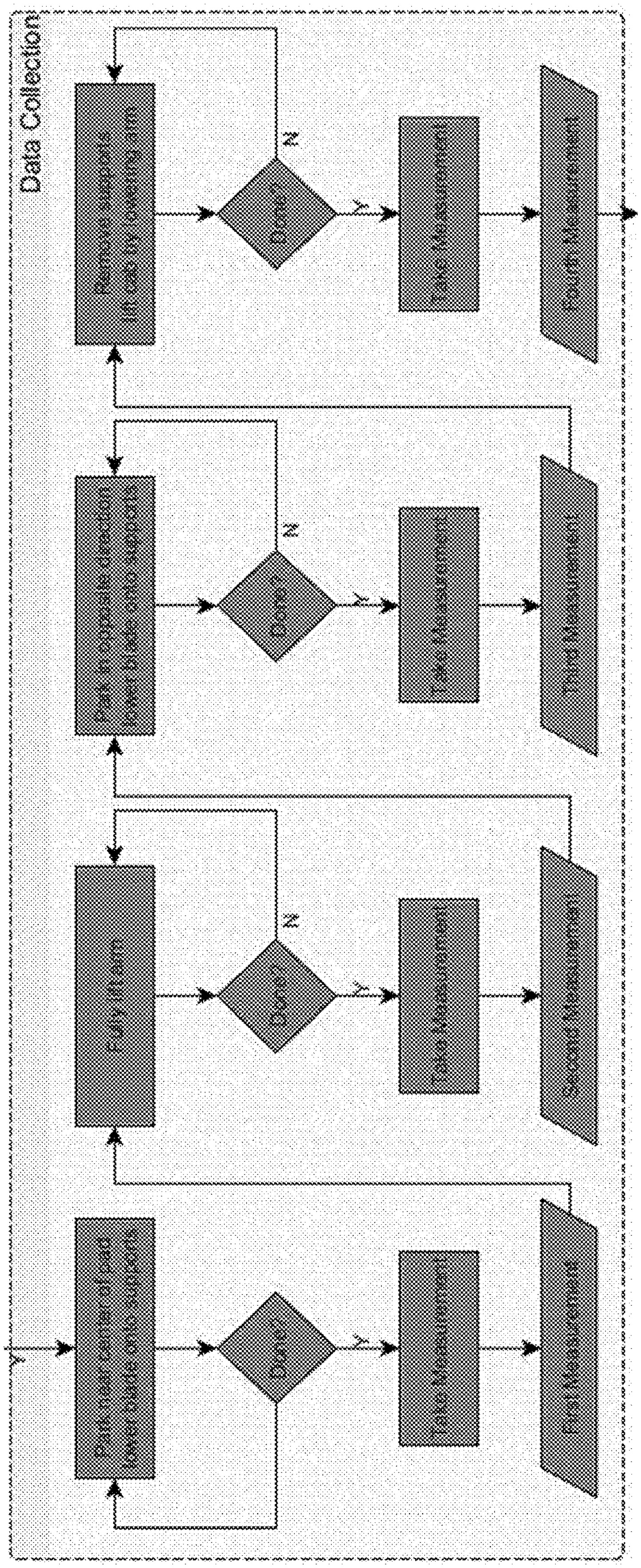
Figure 8C:
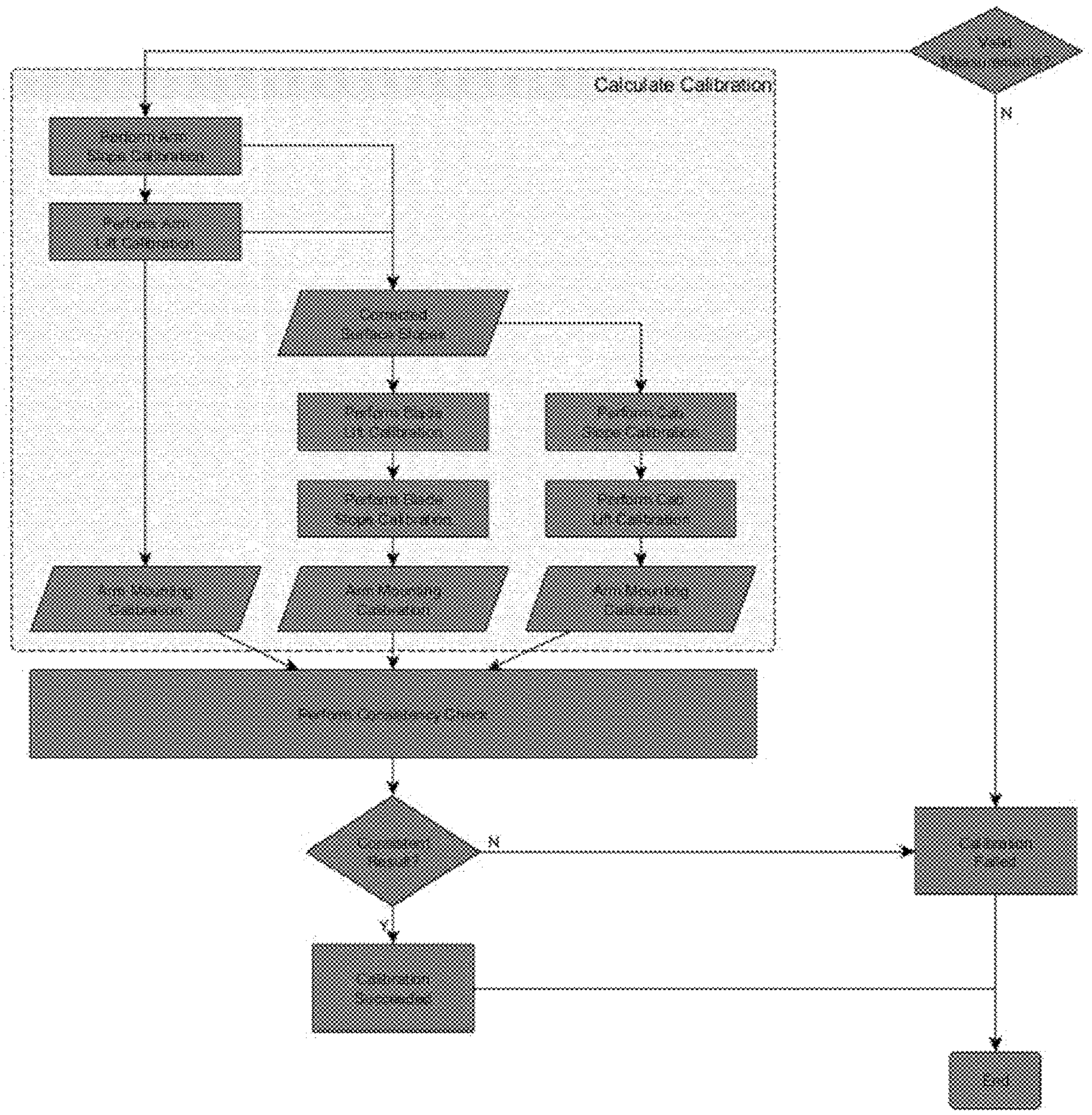

FIGS. 8A, 8B, and 8C together show a schematic block diagram illustrating exemplary steps performed during application of the computer program product for calibrating mounting alignments of a set of IMUs on a construction vehicle 1.

According to this exemplary calibration routine, the arm IMU is calibrated first, then the blade/bucket IMU is calibrated to the arm IMU and then the cab IMU is calibrated to the arm IMU. However, by means of the calibration routine it is also feasible that the cab IMU is calibrated to the blade IMU and then the calibration of the arm IMU relative to the cab IMU or the blade IMU is incorporated.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A non-transitory computer readable media storing instructions that in response to being executed by one or more processors, cause a computer system to perform operations, the operations comprising:

calibrating, via a calibration routine, mounting alignments of a set of inertial measurement units (IMUs) on a construction vehicle, wherein the construction vehicle is selected from dozer, excavator, motor grader, drive loader, skid loader or compact track loader, wherein the set of IMUs comprises at least two IMUs each being mounted on different parts of the construction vehicle, and providing an at least partially automatically executing calibration routine for the mounting alignments of the set of IMUs on the construction vehicle, wherein the calibration routine comprises:

carrying out a sequence of N calibration measurements, with N greater than or equal to three, by the set of IMUs, and adopting for each I-th of the N calibration measurements, with I consecutively from one to N, an I-th pose of the construction vehicle, wherein for the first of the I-th poses:

stopping and aligning the construction vehicle in a first direction on a substantially level ground at a first location, and adopting a first position of the different parts of the construction vehicle relative to one another, wherein a first alignment of the set of IMUs is defined by this first position of the different parts of the construction vehicle relative to one another, wherein for the second of the I-th poses:

aligning the construction vehicle in a second direction, wherein the first and the second direction are rotated substantially 180° to each other, stopping the construction vehicle being aligned in the second direction at a second location, the first and second locations being substantially close and having a substantially equal inclination, and adopting the first position of the different parts of the construction vehicle relative to one another, wherein for the third of the I-th poses:

the construction vehicle has to remain:

aligned in the first direction at the first location, or aligned in the second direction at the second location, and a second position of the different parts of the construction vehicle relative to each other is to be adopted, wherein a second alignment of the set of IMUs is defined by this second position of the different parts of the construction vehicle relative to one another, wherein the following is carried out in course of the calibration routine:

after adoption of the I-th pose of the construction vehicle, initiating the I-th of the N calibration measurements by an onset of a trigger event specifically predefined for the I-th of the N calibration measurements, wherein the N calibration measurements comprise at least acceleration values of acceleration sensors of the set of IMUs, and determining or updating calibration data relating to the respective mounting alignments of the set of IMUs on the construction vehicle based on the N calibration measurements.

2. The non-transitory computer readable media according to claim 1, wherein in the course of the calibration routine, carrying out a consistency check to verify that the calibration data relating to the mounting alignments of the set of IMUs on the construction vehicle have been correctly determined or updated, said consistency check comprising a plurality of sub-checks, wherein for each one of said sub-checks:

determining a cross product of two of the acceleration values determined in the I-th pose from the set of IMUs, matching the determined cross product with a predefined threshold value, wherein the predefined threshold value corresponds to a desired residual misalignment of the set of IMUs, and classifying the calibration data relating to the mounting alignments of the set of IMUs on the construction vehicle as correctly determined or updated by means of the consistency check if each of the determined cross products are below the predefined threshold value.

3. The non-transitory computer readable media according to claim 2, wherein in the case that the calibration data relating to the mounting alignments of the set of IMUs on the construction vehicle are not classified as correctly determined or updated by means of the consistency check, providing a notification to a user of the computer program product, said notification containing at least one of the following information:

for which of the sub-checks the determined cross product was above the predefined threshold value, the likely cause why the determined cross product was above the predefined threshold for the corresponding sub-check, or the magnitude of the residual misalignment of the set of IMUs, wherein the user of the computer program product can input, based on the provided information, whether the result of the consistency check is accepted anyway or whether a repetition of at least one step of the calibration routine is to be carried out.

4. The non-transitory computer readable media according to claim 2, wherein:

the construction vehicle comprises, in addition to a first part on which a first IMU of the set of IMUs is mounted, and a second part on which a second IMU of the set of IMUs is mounted, a third part, and the first, second and third part of the construction vehicle are each configured to be movable relative to the other two parts.

5. The non-transitory computer readable media according to claim 4, wherein:

the first part is configured as a blade or bucket for at least moving and/or raising soil, the second part is configured as a vehicle main part, which comprises at least moving means and/or an operator's cabin, and the third part is configured as an arm by means of which the blade or bucket is connected to the vehicle main part.

6. The non-transitory computer readable media according to claim 4, wherein the set of IMUs comprises a third IMU, and the third IMU is mounted on the third part of the construction vehicle, wherein by moving the first, second or third part relative to the other two parts, the alignment of the first, second or third IMU relative to the other two IMUs is altered.

7. The non-transitory computer readable media according to claim 1, wherein in the course of the calibration routine for the first and the second of the I-th poses, lowering a blade or bucket of the construction vehicle, by lowering the arm, onto:

the substantially level ground, or a support structure located on the substantially level ground, wherein by means of this support structure the blade or bucket in the lowered state is horizontally aligned with the moving means of the construction vehicle, in which lowered state of the blade or bucket the first position of the vehicle main part, the arm and the blade or bucket relative to each other has been adopted, and the first alignment of the first, second and third IMU relative to one another is defined by this first position.

8. The non-transitory computer readable media according to claim 1, wherein in the course of the calibration routine for the third of the I-th poses:

raising the blade or bucket of the construction vehicle from the substantially level ground or the support structure, by raising the arm, or lowering the blade or bucket of the construction vehicle to the substantially level ground, by lowering the arm, and applies such high pressure to the ground that at least part of the vehicle main part raises from the ground, in which state of the vehicle main part, the arm and a blade or bucket the second position of the vehicle main part, the arm and the blade or bucket relative to each other has been adopted, and the second alignment of the first, second and third IMU relative to one another is defined by this second position.

9. The non-transitory computer readable media according to claim 6, wherein in the course of the calibration routine:

determining further roll and pitch angles ($\varphi,\theta$) for the third IMU based on third IMU measurements in the first pose and the second pose, based on the roll and pitch angles ($\varphi,\theta$) determined for the third IMU, determining misalignments of said roll and pitch angles ($\varphi,\theta$) with the substantially level ground, and based on the determined roll and pitch misalignments, correcting the acceleration values determined by the acceleration sensors of the set of IMUs.

10. The non-transitory computer readable media according to claim 1, wherein a notification is providable to the user of the computer program product, said notification containing information about whether and/or when a re-run of the calibration routine for the mounting alignments of the set of IMUs on the construction vehicle is necessary to ensure that on-going poses of the construction vehicle during work are correctly sensed, wherein the notification is provided to the user of the computer program product in case of at least one of the following events:

movement of an object by means of the first part that is particularly heavy in relation to the weight of the construction vehicle, exchange of at least one of the different parts of the construction vehicle, or occurrence of an event that causes unforeseen vibrations in at least one of the different parts of the construction vehicle.

11. The non-transitory computer readable media according to claim 1, wherein in the course of the calibration routine, determining an IMU axis of the set of IMUs, wherein:

comparing the acceleration values determined in the first pose from the set of IMUs for the respective IMU axis to the gravitational acceleration, wherein the respective IMU axis which comprises an acceleration value closest to the gravitational acceleration is considered as the respective up axis, the acceleration values determined in the third pose from the first IMU and/or the second IMU for the respective IMU axis are usable to determine the respective longitudinal axis, and the respective IMU axis at which the determined acceleration value changes the most when changing from the first to the third pose is considered as the respective forward axis, wherein a sign of the respective determined acceleration value for the respective IMU axis provides the alignment, with a positive sign being aligned with the forward direction and a negative sign being aligned with the backward direction.

12. A method for calibrating mounting alignments of a set of inertial measurement units (IMUs) on a construction vehicle, wherein the construction vehicle is selected from dozer, excavator, motor grader, drive loader, skid loader or compact track loader, wherein the set of IMUs comprises at least two IMUs each being mounted on different parts of the construction vehicle, wherein the method includes an at least partially automatically executed calibration routine for the mounting alignments of the set of IMUs on the construction vehicle, wherein for the calibration routine comprising:

carrying out a sequence of N calibration measurements, with N greater than or equal to three by the set of IMUs, and adopting for each I-th of the N calibration measurements, with I consecutively from one to N, an I-th pose of the construction vehicle, wherein for the first of the I-th poses:

stopping and aligning the construction vehicle in a first direction on a substantially level ground at a first location, and adopting a first position of the different parts of the construction vehicle relative to one another, wherein a first alignment of the set of IMUs is defined by this first position of the different parts of the construction vehicle relative to one another, wherein for the second of the I-th poses:

rotating the construction vehicle is to be aligned in a second direction, wherein the first and the second direction are rotated substantially 180° to each other, stopping the construction vehicle being aligned in the second direction at a second location, the first and second locations being substantially close and having a substantially equal inclination, and adopting the first position of the different parts of the construction vehicle relative to one another, wherein for the third of the I-th poses:

the construction vehicle has to remain:

aligned in the first direction, at the first location, or aligned in the second direction, at the second location, and adopting a second position of the different parts of the construction vehicle relative to each other, wherein a second alignment of the set of IMUs is defined by this second position of the different parts of the construction vehicle relative to one another, wherein the following is carried out in course of the calibration routine:

initiating after adoption of the I-th pose of the construction vehicle the I-th of the N calibration measurements by an onset of a trigger event specifically predefined for the I-th of the N calibration measurements, wherein the N calibration measurements comprise at least acceleration values of acceleration sensors of the set of IMUs, and determining or updating calibration data relating to the respective mounting alignments of the set of IMUs on the construction vehicle based on the N calibration measurements.

13. A method for calibrating mounting alignments of a set of inertial measurement units (IMUs) on a construction vehicle, wherein the construction vehicle is selected from dozer, excavator, motor grader, drive loader, skid loader or compact track loader, wherein the set of IMUs comprises at least two IMUs each being mounted on different parts of the construction vehicle, wherein the method comprises:

carrying out a sequence of N calibration measurements with the set of IMUs, with N greater than or equal to three, adopting an I-th pose with the construction vehicle for each I-th of the N calibration measurements, with I consecutively from one to N, wherein the adoption of the first of the I-th poses comprises:

stopping the construction vehicle aligned in a first direction on a substantially level ground at a first location, and adopting a first position of the different parts of the construction vehicle relative to one another, wherein a first alignment of the set of IMUs is defined by this first position of the different parts of the construction vehicle relative to one another, wherein the adoption of the second of the I-th poses comprises:

aligning the construction vehicle in a second direction, wherein the first and the second direction are rotated substantially 180° to each other, stopping the construction vehicle being aligned in the second direction at a second location, the first and second locations being substantially close and having a substantially equal inclination, and adopting the first position of the different parts of the construction vehicle relative to one another, and wherein the adoption of the third of the I-th poses comprises:

remaining the construction vehicle:

aligned in the first direction, at the first location, or aligned in the second direction, at the second location, and adopting a second position of the different parts of the construction vehicle relative to each other, wherein a second alignment of the set of IMUs is defined by this second position of the different parts of the construction vehicle relative to one another, initiating the I-th of the N calibration measurements after adoption of the I-th pose of the construction vehicle by an onset of a trigger event specifically predefined for the I-th of the N calibration measurements, wherein the N calibration measurements comprise at least acceleration values of acceleration sensors of the set of IMUs, and determining or updating calibration data relating to the respective mounting alignments of the set of IMUs on the construction vehicle based on the N calibration measurements.

* * * * *